(12) United States Patent
Akhtar et al.

(10) Patent No.: US 7,942,637 B2
(45) Date of Patent: May 17, 2011

(54) SPARCAP FOR WIND TURBINE ROTOR BLADE AND METHOD OF FABRICATING WIND TURBINE ROTOR BLADE

(75) Inventors: Afroz Akhtar, Karnataka (IN); Srikanth Samudrala, Karnataka (IN)

(73) Assignee: General Electric Company, Schenectady, NY (US)

( * ) Notice: Subject to any disclaimer, the term of this patent is extended or adjusted under 35 U.S.C. 154(b) by 128 days.

(21) Appl. No.: 12/332,840

(22) Filed: Dec. 11, 2008

(65) Prior Publication Data

US 2010/0143147 A1 Jun. 10, 2010

(51) Int. Cl.
*B64C 11/24* (2006.01)
*F01D 5/14* (2006.01)

(52) U.S. Cl. .................... 416/226; 416/229 R; 416/230; 29/889.72

(58) Field of Classification Search .................. 416/226, 416/229 R, 230; 290/44, 55; 29/889.21, 29/889.72
See application file for complete search history.

(56) References Cited

U.S. PATENT DOCUMENTS

| | | | |
|---|---|---|---|
| 4,081,220 A | | 3/1978 | Andrews |
| 4,264,278 A | | 4/1981 | Weingart |
| 4,976,587 A | * | 12/1990 | Johnston et al. ............. 416/230 |
| 5,375,324 A | * | 12/1994 | Wallace et al. ............ 29/889.21 |
| 5,476,704 A | | 12/1995 | Kohler |
| 5,755,558 A | | 5/1998 | Reinfelder et al. |
| 6,607,997 B1 | | 8/2003 | Cox et al. |
| 7,153,090 B2 | * | 12/2006 | DeLeonardo et al. ......... 415/4.2 |
| 7,198,471 B2 | * | 4/2007 | Gunneskov et al. ...... 416/229 R |
| 7,377,752 B2 | | 5/2008 | Mohamed |
| 7,427,189 B2 | | 9/2008 | Eyb |
| 2003/0084748 A1 | | 5/2003 | Shimizu et al. |
| 2005/0180854 A1 | | 8/2005 | Grabau et al. |
| 2005/0186081 A1 | * | 8/2005 | Mohamed ..................... 416/226 |

(Continued)

FOREIGN PATENT DOCUMENTS

JP 54076333 A 6/1979

(Continued)

OTHER PUBLICATIONS

Thomsen, O.T., Sandwich Materials for Wind Turbine Blades, Proceedings of the 27th Risø International Symposium on Materials Science: Polymer Composite Materials for Wind Power Turbines, Risø National Laboratory, Roskilde, Denmark, 2006, pp. 97-114.

(Continued)

*Primary Examiner* — Edward Look
*Assistant Examiner* — Sean J Younger
(74) *Attorney, Agent, or Firm* — James McGinness, Esq.; Armstrong Teasdale LLP (57) ABSTRACT

A sparcap for a wind turbine rotor blade. The sparcap includes a first carbon material layer coupled to an inner surface of the wind turbine rotor blade. The first carbon material layer extends along at least a portion of a length of the wind turbine rotor blade. A core material is coupled to the first carbon material layer. The core material is positioned with respect to a buckling prone region of the wind turbine rotor blade. A second carbon material layer covers the core material and is coupled to the first carbon material layer and/or the core material. The second carbon material layer extends along at least a portion of the length of the wind turbine rotor blade.

18 Claims, 5 Drawing Sheets

U.S. PATENT DOCUMENTS

| | | | |
|---|---|---|---|
| 2006/0225278 A1* | 10/2006 | Lin et al. | 29/889.72 |
| 2007/0149084 A1 | 6/2007 | Rouison et al. | |
| 2007/0189902 A1 | 8/2007 | Mohamed | |
| 2007/0251090 A1* | 11/2007 | Breugel et al. | 29/889.7 |
| 2008/0181781 A1 | 7/2008 | Livingston et al. | |
| 2008/0277053 A1* | 11/2008 | Stiesdal | 156/245 |

FOREIGN PATENT DOCUMENTS

| | | |
|---|---|---|
| JP | 1141921 A | 6/1989 |
| JP | 3000788 A | 1/1991 |
| JP | 3187726 A | 8/1991 |
| JP | 03247368 | 11/1991 |
| JP | 7300738 A | 11/1995 |
| JP | 10016072 A | 1/1998 |
| JP | 11117664 A | 4/1999 |
| JP | 11262546 A | 9/1999 |
| JP | 2001246686 | 9/2001 |
| JP | 2005133141 A | 5/2005 |
| JP | 2006044037 A | 2/2006 |
| JP | 2006161669 | 6/2006 |
| JP | 2006226327 A | 8/2006 |
| JP | 2006282099 A | 10/2006 |
| JP | 2007170328 | 7/2007 |
| WO | 2004078465 A1 | 9/2004 |

OTHER PUBLICATIONS

Thomsen, O.T., Sandwich Materials for Wind Turbine Blades, PowerPoint Presentation, 27th International Conference on Materials Science: Polymer Composite Materials for Wind Power Turbines, Sep. 4-7, 2006, Riso National Laboratory, Denmark.

Lund, E., Kuhlmeier, L. and Stegmann, J., Buckling Optimization of Laminated Hybrid Composite Shell Structures Using Discrete Material Optimization, 6th World Congress on Structural and Multidisciplinary Optimization, Rio de Janeiro, May 30-Jun. 3, 2005, Brazil, pp. 1-10.

* cited by examiner

SPARCAP FOR WIND TURBINE ROTOR BLADE AND METHOD OF FABRICATING WIND TURBINE ROTOR BLADE

BACKGROUND OF THE INVENTION

The embodiments described herein relate generally to a wind turbine rotor blade and, more particularly, to a sparcap for a wind turbine rotor blade.

Wind turbine blades typically include two blade shell portions of fiber reinforced polymer. The blade shell portions are molded and then coupled together along cooperating edges using a suitable adhesive material. At least some turbine blades include one or more bracings that are adhesively coupled to an inner surface of a first blade shell portion. A cooperating second blade shell portion is then arranged on top of the bracings and adhesively coupled to the first blade shell portion along its edges.

The blade shell portions are typically made using suitable evenly distributed fibers, fiber bundles, or mats of fibers layered in a mold part. However, the blade shell portions are relatively light and have only low rigidity. Therefore, a stiffness and a rigidity, as well as a buckling strength, of the blade shell portions may not withstand the loads and forces exerted on the rotor blade during operation. To increase the strength of the rotor blade, the blade shell portions are reinforced by sparcaps laminated to the inner surface of the blade shell portions.

Flapwise loads, which cause the rotor blade tip to deflect towards the wind turbine tower, are transferred along the rotor blade predominantly through the sparcaps. At least some conventional rotor blades include sparcaps fabricated from a suitable carbon material. The stiffness requirements of the conventional wind turbine rotor blade designs may be met by a completely carbon sparcap, but with an undesirable mass and/or cost penalty.

As a length of wind turbine rotor blades continues to increase, meeting stiffness requirements is a major concern in the structural design of the rotor blades. Conventional rotor blades including sparcaps made only of a carbon material meet the strength and stiffness requirements of the rotor blade but the sparcap does not have a sufficient buckling stiffness to meet the buckling factor of 1.25 required by current design certification standards. As a result, in at least some conventional rotor blades a thickness of the carbon material sparcap is increased to increase the buckling factor. Such increased thickness, however, results in a mass penalty and a fabrication cost penalty, as well as an undesirable increase in bending stiffness of the rotor blade.

BRIEF DESCRIPTION OF THE INVENTION

In one aspect, a sparcap for a wind turbine rotor blade is provided. The sparcap includes a first carbon material layer coupled to an inner surface of the wind turbine rotor blade. The first carbon material layer extends along at least a portion of a length of the wind turbine rotor blade. A core material is coupled to the first carbon material layer. The core material is positioned with respect to a buckling prone region of the wind turbine rotor blade. A second carbon material layer covers the core material and is coupled to at least one of the first carbon material layer and the core material. The second carbon material layer extends along at least a portion of the length of the wind turbine rotor blade.

In another aspect, a rotor blade for a wind turbine is provided. The rotor blade includes a first blade section and a second blade section coupled to the first blade section to form the rotor blade. Each of the first blade section and the second blade section has a leading edge and a trailing edge. A first sparcap is coupled to the first blade section and a second sparcap is coupled to the second blade section. Each of the first sparcap and the second sparcap includes a first carbon material layer coupled to an inner surface of a respective blade section. The first carbon material layer extends along at least a portion of a length of the rotor blade. A core material is coupled to the first carbon material layer. The core material is positioned with respect to a buckling prone region of the rotor blade. A second carbon material layer covers the core material and is coupled to at least one of the first carbon material layer and the core material. The second carbon material layer extends along at least a portion of the length of the rotor blade.

In yet another aspect, a method is provided for fabricating a rotor blade for a wind turbine. The method includes forming a first blade section and a second blade section. Each of the first blade section and the second blade section has a leading edge and a trailing edge. A first sparcap is coupled to an inner surface of the first blade section. The first sparcap includes at least one carbon material layer and at least one core material section.

DETAILED DESCRIPTION OF THE INVENTION

The embodiments described herein provide a rotor blade for a wind turbine that includes a suitable sparcap for providing sufficient strength to the rotor blade while decreasing an overall weight of the rotor blade and/or fabrication cost. Efficient utilization of a carbon material, such as carbon fibers or a carbon fiber reinforced matrix, and a core material, such as a foam or suitable wood material, for fabrication of the sparcap produces a lighter and cost-effective rotor blade. Further, use of a core material in the sparcap having a higher compressive strength and a lower density than a carbon material increases a buckling stiffness of the sparcap without significantly increasing a mass of the sparcap and/or a fabrication cost for the sparcap. In one embodiment, the core material is positioned at one or more regions in the rotor blade susceptible to buckling forces. With appropriate use of both materials, rotor blade design requirements are met with a minimal material consumption and a minimal increase in rotor blade mass.

Figure 1:
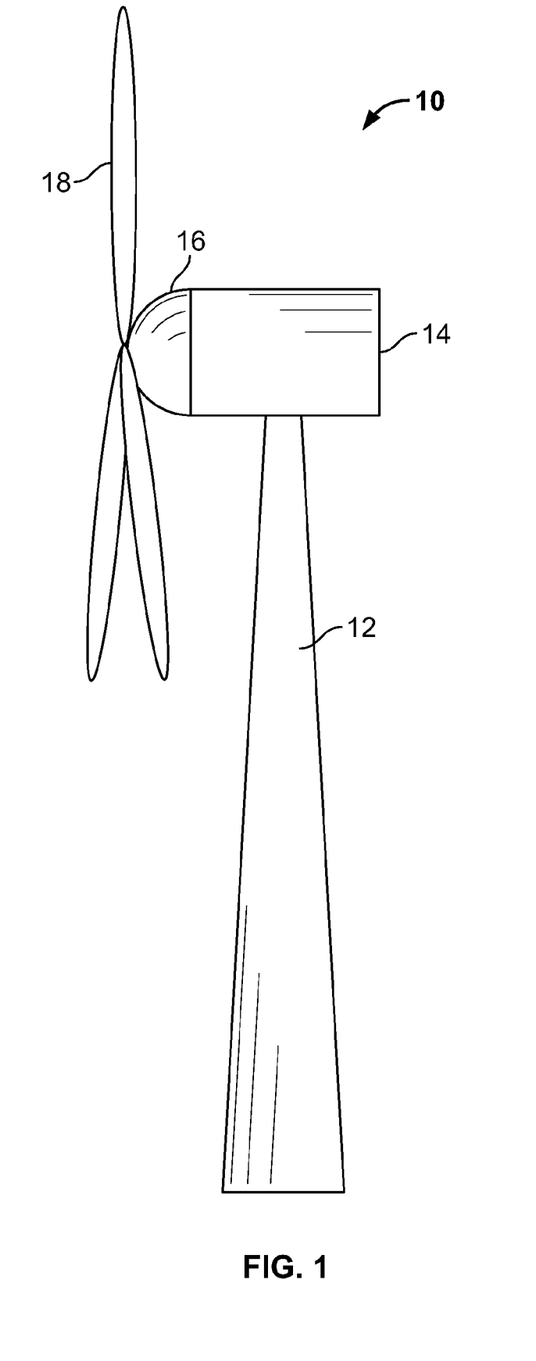
FIG. 1 is a schematic view of a wind turbine.

FIG. 1 is a schematic view of a wind turbine 10. Wind turbine 10 includes a tower 12 to which a machine nacelle 14 is mounted at a first or top end portion. A hub 16 having a plurality of rotor blades 18, such as three rotor blades 18, is mounted to a first lateral end of machine nacelle 14.

Figure 2:
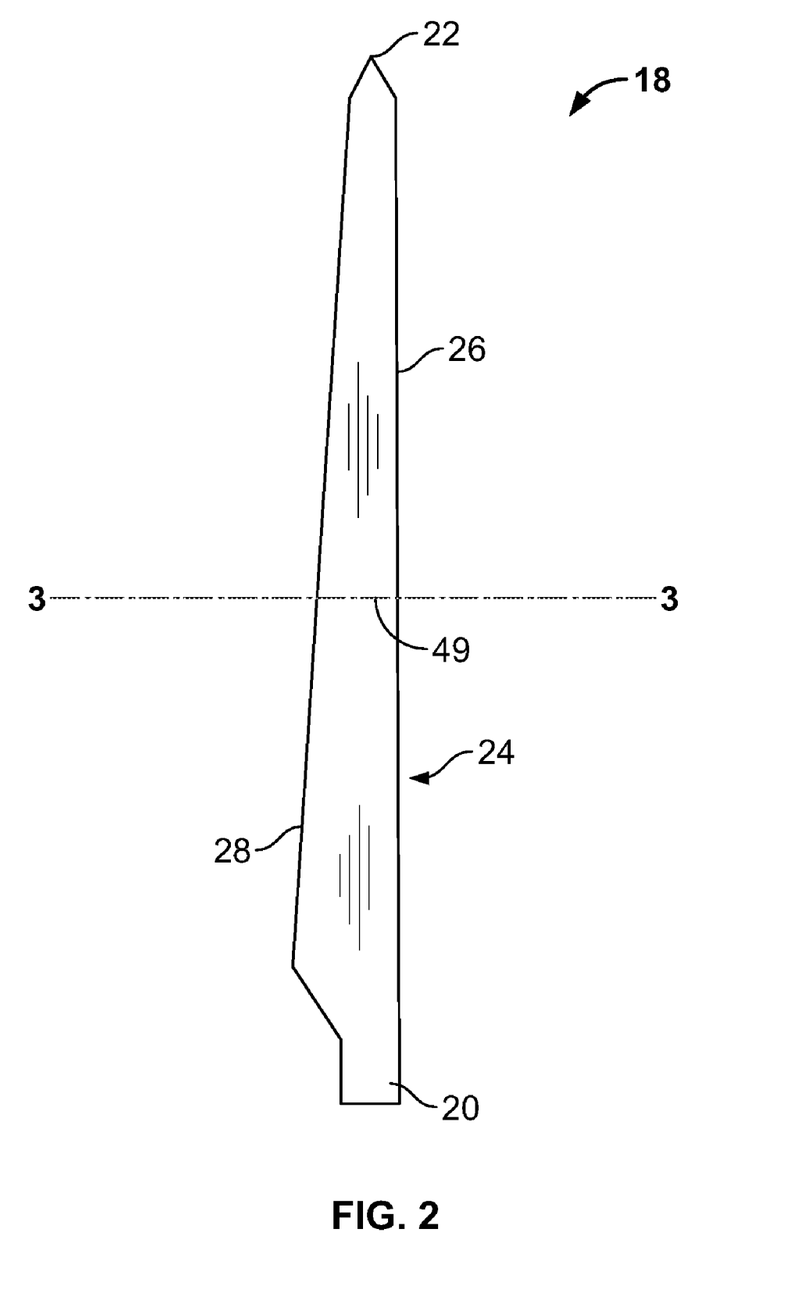
FIG. 2 is a side view of an exemplary wind turbine rotor blade.

FIG. 2 is a schematic view of an exemplary configuration of rotor blade 18. Rotor blade 18 includes a first end or root section 20 configured to facilitate mounting rotor blade 18 to hub 16 and a second or tip end 22 opposing root section 20. A body 24 of rotor blade 18 extends between root section 20 and tip end 22. In one embodiment, rotor blade 18 includes a first blade section 26, such as a suction side blade section, and an opposing second blade section 28, such as a pressure side blade section, coupled to first blade section 26 to form rotor blade 18. Further, a suction side sparcap (not shown in FIG. 2) is provided at an inner surface of the suction side rotor blade shell and/or a pressure side sparcap (not shown in FIG. 2) is provided at an inner surface of the pressure side rotor blade shell. Typically, the suction side sparcap and/or the pressure side sparcap extend almost the full longitudinal length of rotor blade 18. However, shorter sparcaps may be used in alternative embodiments.

Figures 3, 4, 5:
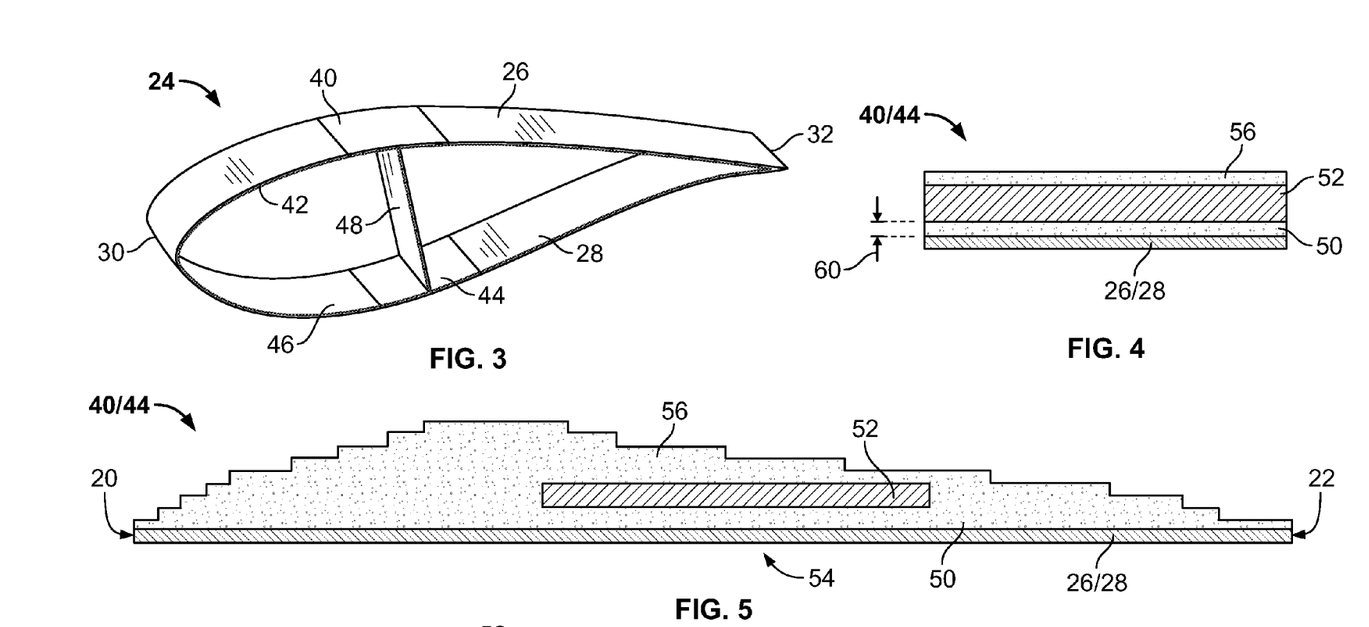
FIG. 3 is a cross-sectional view of an exemplary wind turbine rotor blade.
FIG. 4 is a partial cross-sectional view of an exemplary sparcap for a wind turbine rotor blade.
FIG. 5 is a schematic view of a thickness distribution for the sparcap shown in FIG. 4 along a length of a wind turbine rotor blade.

FIG. 3 is a cross-sectional view of an exemplary body 24 of rotor blade 18 along sectional line 3-3 in FIG. 2. As shown in FIG. 3, first blade section 26, such as a suction side blade section, is coupled to second blade section 28, such as a pressure side blade section, to form rotor blade 18 defining a contour of rotor blade 18 as shown in the cross-sectional views. It should be apparent to those skilled in the art and guided by the teachings herein provided that any suitable method may be used to couple second blade section 28 to first blade section 26 to form rotor blade 18. In this embodiment, first blade section 26 and second blade section 28 are coupled at a leading edge 30 and an opposing trailing edge 32 of rotor blade 18.

Figure 7:
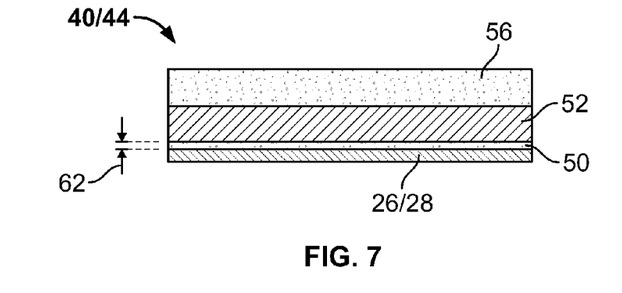
FIG. 7 is a partial cross-sectional view of an exemplary sparcap for a wind turbine rotor blade.
Figure 9:
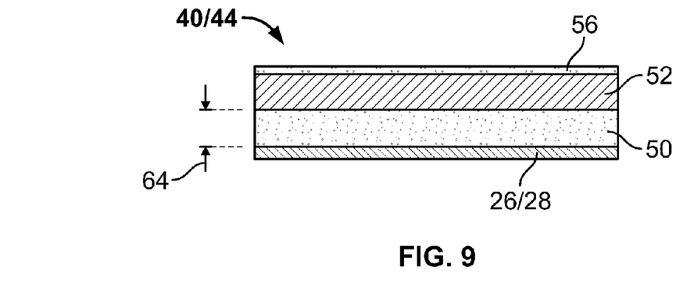
FIG. 9 is a partial cross-sectional view of an exemplary sparcap for a wind turbine rotor blade.

Referring further to FIG. 3, a first sparcap 40 is positioned on and coupled to an inner surface 42 of first blade section 26. A second sparcap 44 is positioned on and coupled to an inner surface 46 of second blade section 28. In one embodiment, a sparweb 48 couples first sparcap 40 to second sparcap 44. Referring further to FIGS. 4, 7 and 9, in one embodiment, first sparcap 40 and/or second sparcap 44 includes a first carbon material layer 50 and one or more core material sections 52 positioned on and coupled to first carbon material layer 50 along a length of rotor blade 18 at or near a buckling prone region 54 of rotor blade 18. A second carbon material layer 56 is positioned over core material section 52 to cover at least a portion of core material section 52 and sandwich core material section 52 between first carbon material layer 50 and second carbon material layer 56. In an alternative embodiment, first sparcap 40 and/or second sparcap 44 includes a carbon material having one or more core material sections distributed in the carbon material and positioned with respect to a corresponding buckling prone region of the rotor blade.

In one embodiment, at least one first carbon material layer 50 is formed on, or applied or laminated to a respective inner surface 42 or inner surface 46 of rotor blade 18 to couple first carbon material layer 50 to respective inner surface 42 or inner surface 46. In one embodiment, first carbon material layer 50 includes a plurality of carbon fibers, such as a suitable carbon fiber reinforced matrix layer. In alternative embodiments, first carbon material layer 50 may include any suitable carbon material known to those skilled in the art and guided by the teachings herein provided. Suitable carbon materials include, without limitation, unidirectional or bidirectional carbon roving, unidirectional or bidirectional carbon prepreg, unidirectional or bidirectional carbon tape or mat and any other suitable carbon fiber preforms. Carbon prepregs include unidirectional or bidirectional fibers pre-impregnated with a B-stage resin (i.e., carbon fibers enriched with resin prior to lay-up) and carbon fiber preforms are formed by injecting a resin into a dry stack of carbon fibers oriented in a desired orientation, and shaped or formed to a final shape in an external mold or mandrel. First carbon material layer 50 extends along at least a portion of a length of rotor blade 18 and has a width that extends at least partially between leading edge 30 and trailing edge 32 of rotor blade 18. In a particular embodiment, first carbon material layer 50 extends almost the full length of rotor blade 18. However, shorter sparcaps may be used in alternative embodiments.

Figure 6:
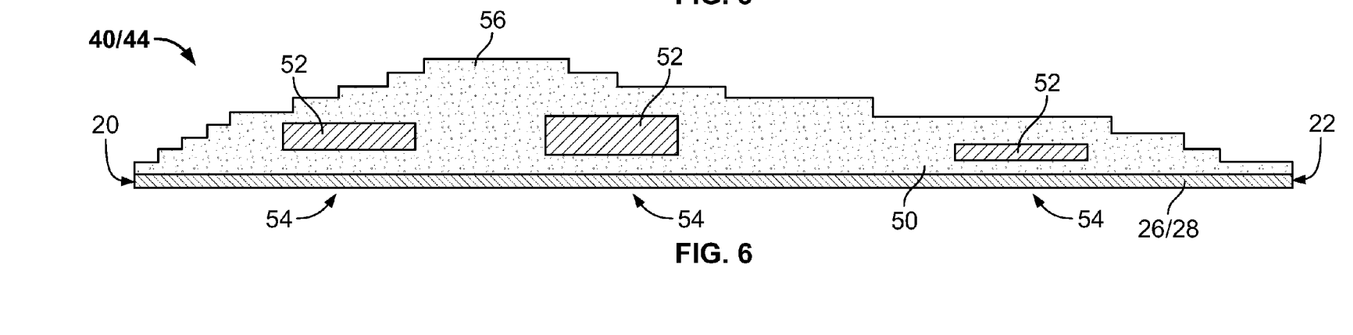
FIG. 6 is a schematic view of an alternative thickness distribution for the sparcap shown in FIG. 4 along a length of a wind turbine rotor blade.
Figure 8:
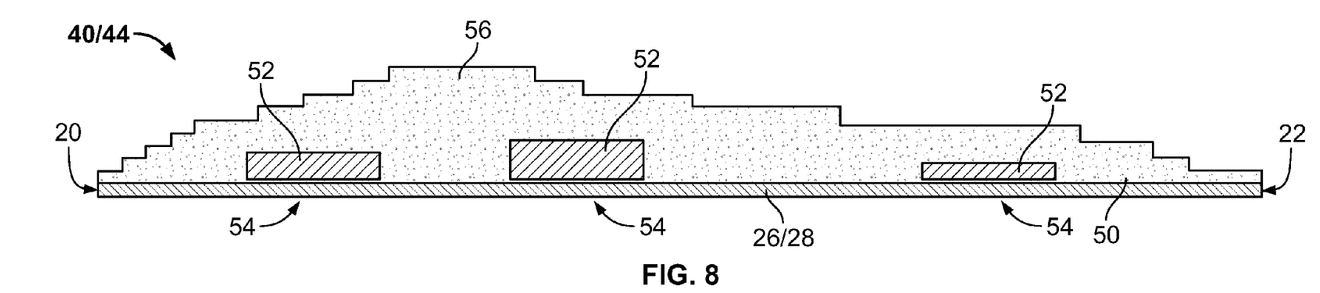
FIG. 8 is a schematic view of a thickness distribution for the sparcap shown in FIG. 7 along a length of a wind turbine rotor blade.
Figure 10:
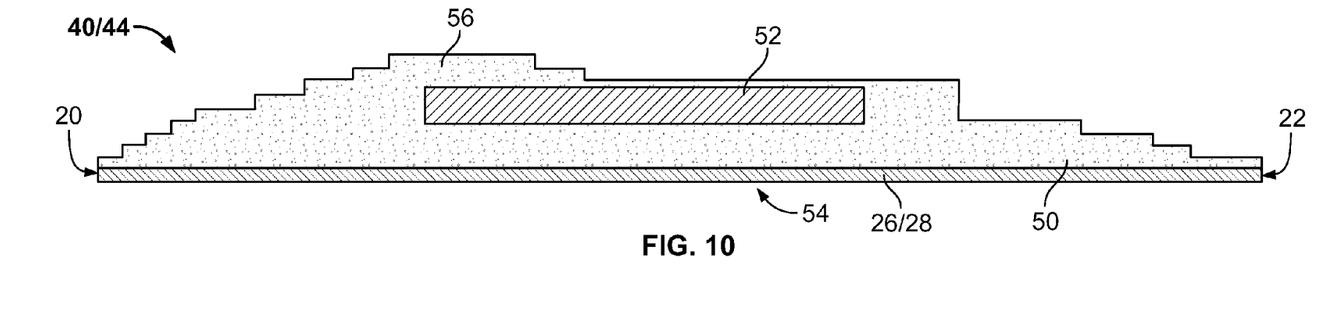
FIG. 10 is a schematic view of a thickness distribution for the sparcap shown in FIG. 9 along a length of a wind turbine rotor blade.

At least one core material section 52 is positioned on and coupled to first carbon material layer 50. Core material section 52 is coupled to first carbon material layer 50 and positioned with respect to a corresponding buckling prone region 54 of rotor blade 18, such as shown in FIGS. 5 and 10, or a plurality of core material sections 52 may be coupled to first carbon material 50 and positioned along the length of rotor blade 18 with respect to a corresponding buckling prone region 54 of rotor blade 18, such as shown in FIGS. 6 and 8. Each core material section 52 extends along at least a portion of the length of rotor blade 18. Core material section 52 is made of any suitable core material known to those skilled in the art and guided by the teachings herein provided including, without limitation, one or more of a foam material, any suitable wood material such as balsa wood or spruce wood, and any suitable polymeric material.

At least one second carbon material layers 56 is formed on or applied or laminated to core material section 52. Second carbon material layer 56 is coupled to first carbon material layer 50 and/or core material section 52 and extends along at least a portion of the length of rotor blade 18. Second carbon material layer 56 includes any suitable carbon material such as described above in reference to first carbon material layer 50. In one embodiment, the sparcaps described herein are formed on or applied or laminated to an inner surface of the respective blade section. However, it should be apparent to those skilled in the art and guided by the teachings herein provided that any suitable method may be used to couple the sparcaps to the inner surface of the respective blade section.

Figure 11:
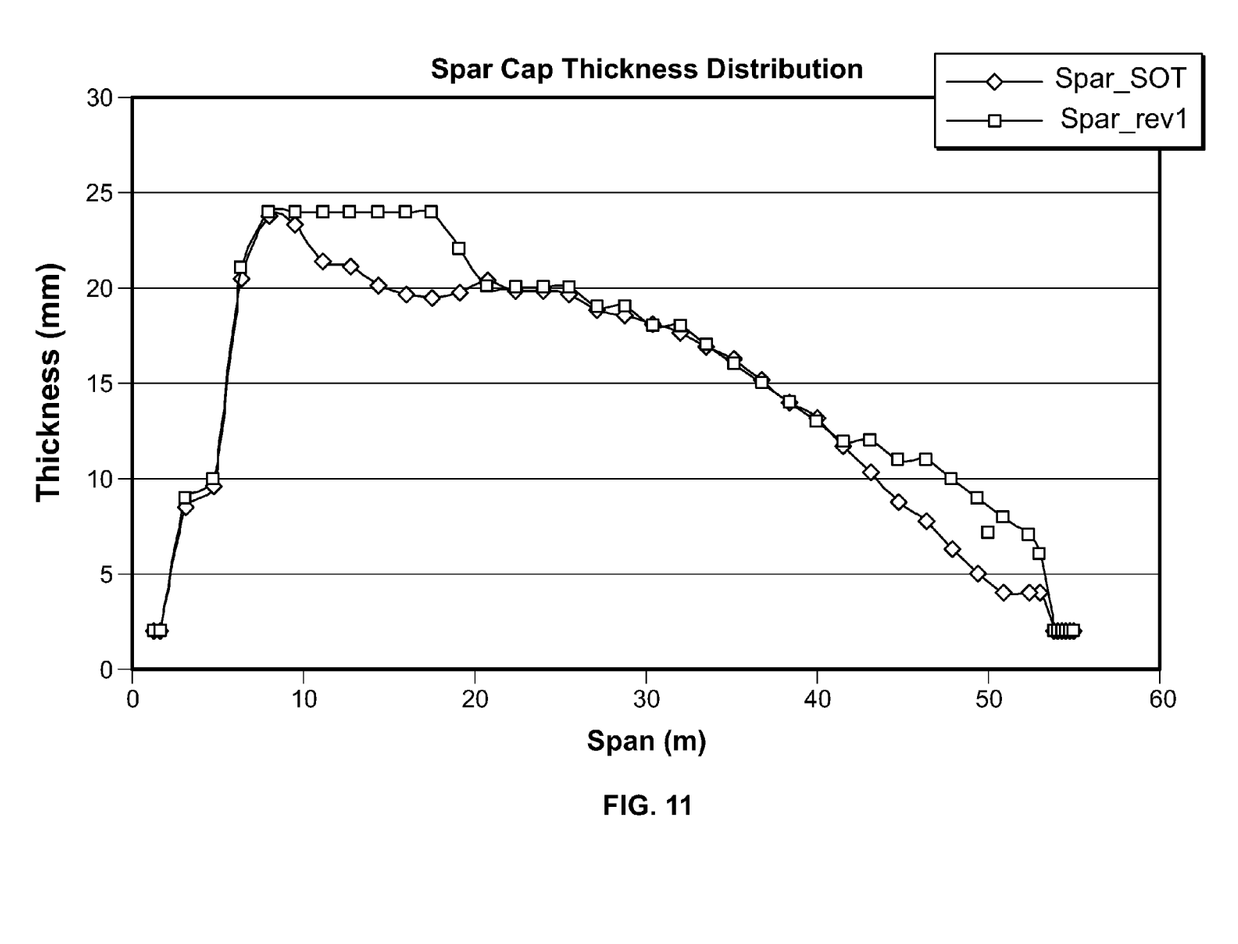
FIG. 11 is a graph of a thickness of an exemplary sparcap along a length or span of a wind turbine rotor blade.

In one embodiment, first sparcap 40 and/or second sparcap 44 has a thickness that varies along a length from root section 20 to tip end 22, referring further to FIG. 2, and/or a width of rotor blade 18. For example, as shown in FIGS. 5, 6, 8, 10, and 11, first sparcap 40 and/or second sparcap 44 has a thickness distribution that varies along the length of rotor blade 18 between root section 20 and tip end 22. Further, as shown in FIGS. 4-11, a thickness of first carbon material layer 50, a thickness of each core material section 52, and/or a thickness of second carbon material layer 56 may vary in alternative embodiments. For example, as shown in FIG. 4, first carbon material layer 50 has a thickness 60 and, as shown in FIG. 7, first carbon material layer 50 has a second thickness 64 different than first thickness 60. Further, as shown in FIG. 9, first carbon material layer 50 has a third thickness 64 different than first thickness 60 and second thickness 62. In one embodiment, first sparcap 40 and/or second sparcap 44 has a thickness distribution as shown in FIG. 11. In this embodiment, rotor blade 18 has a span along the length of rotor blade 18 between root section 20 and tip end 22 of about 55 meters (m) and first sparcap 40 and/or second sparcap 44 has a width between leading edge 30 and trailing edge 32 of about 650 millimeters (mm).

A thickness of first sparcap 40 and/or second sparcap 44 varies along the span of rotor blade 18 and the thickness of first sparcap 40 and/or the thickness of second sparcap 44 at any cross-section of rotor blade 18 depends on design requirements. However, in the embodiment shown in FIG. 11, the thickness of first sparcap 40 and/or the thickness of second sparcap 44 of rotor blade 18 (having a length of about 55 m) varies from about 1 mm to about 50 mm. Further, a thickness of first carbon material layer 50 and a thickness of second carbon material layer 56 may vary to provide any suitable portion of the respective sparcap thickness. Similarly, a thickness of core material layer 52 may vary to provide any suitable portion of the respective sparcap thickness. For example, in one embodiment, the thickness of core material layer 52 varies from about 6 mm to about 36 mm.

It should be apparent to those skilled in the art and guided by the teachings herein provided that first carbon material layer 50, core material section 52, and/or second carbon material layer 56 may have any suitable thickness such that the thickness distribution of sparcap 40 and/or sparcap 44 along a length of rotor blade 18 between root section 20 and tip end 22 is optimized to prevent or limit buckling at buckling prone region(s) 54 of rotor blade 18. Further, it should be apparent to those skilled in the art and guided by the teachings herein provided that first carbon material layer 50 and second carbon material layer 56 may include any suitable number of layers of carbon material, and that any suitable number of core material sections having suitable dimensions may be positioned with respect to buckling prone region(s) 54 of rotor blade 18. In alternative embodiments, first carbon material layer 50 and second carbon material layer 56 may be integrated or formed as a unitary carbon material layer with one or more core material sections 52 distributed throughout the unitary carbon material layer and positioned with respect to buckling prone region(s) 54 of rotor blade 18.

In one embodiment, a method for fabricating rotor blade 18 for a wind turbine includes providing a first blade section and a cooperating second blade section. Each of the first blade section and the second blade section has a leading edge and a trailing edge. A first sparcap is coupled to, such as applied to or formed or laminated on, an inner surface of the first blade section. The first sparcap includes at least one carbon material layer and at least one core material section. A second sparcap is coupled to, such as applied to or formed or laminated on, an inner surface of the second blade section. The second sparcap includes at least one carbon material layer and at least one core material section. In one embodiment, the second sparcap is coupled to the first sparcap with a suitable sparweb.

In one embodiment, a first carbon material layer is coupled to, such as formed on or applied or laminated to, the inner surface of the first blade section. The first carbon material layer extends along at least a portion of a length of the wind turbine rotor blade. One or more core material sections are positioned on the first carbon material layer and a second carbon material layer is coupled to, such as formed on or applied or laminated to, the one or more core material sections. The second carbon material layer extends along at least a portion of the length of the wind turbine rotor blade. Similarly, the second sparcap is coupled to an inner surface of the second blade section.

As shown in Table 1 and Table 2, rotor blade 18 as described above in reference to FIG. 11 was analyzed for buckling parameters at or near one or more buckling prone regions.

TABLE 1

| Modes | Buckling bins (8 Nos) | | | | | | | |
|---|---|---|---|---|---|---|---|---|
|  | 0 | 45 | 90 | 135 | 180 | 225 | 270 | 315 |
| 1 | 0.55 | 0.92 | 3.77 | 0.64 | 0.54 | 2.05 | 1.31 | 0.66 |
| 2 | 0.55 | 0.93 | 3.79 | 0.64 | 0.54 | 2.07 | 1.33 | 0.67 |
| 3 | 0.56 | 0.93 | 3.82 | 0.67 | 0.56 | 2.06 | 1.48 | 0.75 |

TABLE 2

| Modes | Buckling bins (8 Nos) | | | | | | | |
|---|---|---|---|---|---|---|---|---|
|  | 0 | 45 | 90 | 135 | 180 | 225 | 270 | 315 |
| 1 | 1.06 | 1.43 | 5.90 | 1.25 | 1.25 | 3.49 | 2.74 | 1.67 |
| 2 | 1.08 | 1.47 | 5.96 | 1.25 | 1.27 | 3.54 | 2.76 | 1.68 |
| 3 | 1.25 | 1.78 | 5.97 | 1.27 | 1.52 | 3.69 | 3.05 | 1.80 |

As described above, a 55 m rotor blade was analyzed to determine a rotor blade buckling strength. The rotor blade was initially provided with a sparcap having a width of 650 mm and buckling analysis was performed. Table 1 shows buckling load factors for eight different load bins and for the first three modes for a conventional rotor blade including a carbon sparcap. A buckling load factor indicates a percentage of the applied load required for the rotor blade to buckle.

Table 2 shows buckling load factors for eight different load bins and for the first three modes for a rotor blade including a sparcap made of a carbon material and a core material, as described herein. Referring to Table 2, utilizing or positioning a core material at or near a buckling prone region of the rotor blade increases a minimum buckling load factor to about 106% from about 55% for the conventional rotor blade.

As shown in Table 1, buckling of a rotor blade can be avoided with the use of a core material section having a thickness of 25 mm with a suitable carbon material positioned at or near a buckling prone region of the rotor blade. A rotor blade having a sparcap fabricated only of carbon material has a total weight of 6,758 kilograms (kg) and a sparcap weight of 1,729 kg, while a rotor blade having a sparcap fabricated of a carbon material and a core material has a total weight of 6,685 kg and a sparcap weight of 1,656 kg (1,631 kg or carbon and 25 kg of core material). The sparcap as described herein including a carbon material and a core material is 73 kg lighter than a conventional sparcap including only a carbon material. Conventional sparcaps made only of a carbon material require an additional 98 kg of carbon to suppress buckling, while the sparcap as described herein requires a core material of about 25 kg to sufficiently address identical buckling considerations. Usage of the sparcap described herein saves about 98 kg of carbon material with a consumption of about 25 kg of core material, while satisfying strength, bending stiffness and buckling stiffness requirements.

The sparcap as described herein effectively combines the beneficial properties of a carbon material and a less-costly core material to facilitate significantly improving a buckling factor of the rotor blade. Different configurations of the sparcap with the carbon material and the core material, including an amount of core material and/or a lay-up configuration for example, satisfy various rotor blade design requirements. The sparcap as described herein facilitates fabricating a longer and lighter rotor blade, significantly increases a sparcap buckling failure margin by efficient use of materials, and enables wind turbine rotor blade designers to choose and optimize a sparcap width, length, and/or thickness (including a thickness distribution along the length and/or the width of the rotor blade) for a cost-effective, lighter sparcap.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sparcap for a wind turbine rotor blade, the wind turbine rotor blade comprising a first blade section and a second blade section coupled at a leading edge and a trailing edge to form the wind turbine rotor blade, said sparcap comprising:
    a first carbon material layer coupled to an inner surface of the first blade section, said first carbon material layer extending along at least a portion of a length of the wind turbine rotor blade;
    a core material coupled to said first carbon material layer, said core material positioned with respect to a buckling prone region of the wind turbine rotor blade; and
    a second carbon material layer covering said core material and coupled to at least one of said first carbon material layer and said core material, said second carbon material layer extending along at least a portion of the length of the wind turbine rotor blade.

2. A sparcap in accordance with claim 1 wherein said core material extends along at least a portion of the length of the wind turbine rotor blade.

3. A sparcap in accordance with claim 1 further comprising a plurality of core material sections positioned along the length of the wind turbine rotor blade.

4. A sparcap in accordance with claim 3 wherein each core material section of said plurality of core material sections is positioned with respect to a corresponding buckling prone region of the wind turbine rotor blade.

5. A sparcap in accordance with claim 1 wherein a thickness of said sparcap varies along a length of said rotor blade.

6. A sparcap in accordance with claim 1 wherein said sparcap has a thickness distribution that varies along a length of the wind turbine rotor blade.

7. A sparcap in accordance with claim 1 wherein each of said first carbon material layer and said second carbon material layer comprises a plurality of carbon fibers.

8. A sparcap in accordance with claim 1 wherein each of said first carbon material layer and said second carbon material layer comprises a carbon fiber reinforced matrix.

9. A sparcap in accordance with claim 1 wherein said core material comprises at least one of a foam material, a wood material and a polymeric material.

10. A rotor blade for a wind turbine, said rotor blade comprising:
    a first blade section and a second blade section coupled to said first blade section to form said rotor blade, each of said first blade section and said second blade section having a leading edge and a trailing edge;
    a first sparcap coupled to said first blade section;
    a second sparcap coupled to said second blade section, each of said first sparcap and said second sparcap comprising:
        a first carbon material layer coupled to an inner surface of a respective blade section, said first carbon material layer extending along at least a portion of a length of said rotor blade;
        a core material coupled to said first carbon material layer, said core material positioned with respect to a buckling prone region of said rotor blade; and
        a second carbon material layer covering said core material and coupled to at least one of said first carbon material layer and said core material, said second carbon material layer extending along at least a portion of the length of said rotor blade; and
    at least one sparweb coupling said first sparcap to said second sparcap.

11. A rotor blade in accordance with claim 10 wherein said core material extends along at least a portion of the length of said rotor blade.

12. A rotor blade in accordance with claim 10 further comprising a plurality of core material sections positioned along the length of said rotor blade.

13. A rotor blade in accordance with claim 12 wherein each core material section of said plurality of core material sections is positioned with respect to a corresponding buckling prone region of said rotor blade.

14. A rotor blade in accordance with claim 10 wherein at least one of a thickness of said first sparcap and a thickness of said second sparcap varies along a length of said rotor blade.

15. A rotor blade in accordance with claim 10 wherein at least one of said first sparcap and said second sparcap has a thickness distribution that varies along a length of said rotor blade.

16. A method for fabricating a rotor blade for a wind turbine, said method comprising:
    forming a first blade section and a second blade section, each of the first blade section and the second blade section having a leading edge and a trailing edge; and
    coupling a first sparcap to an inner surface of the first blade section, the first sparcap comprising at least one carbon material layer and at least one core material section, wherein coupling a first sparcap to an inner surface of the first blade section comprises:
        coupling a first carbon material layer to the inner surface of the first blade section, the first carbon material layer extending along at least a portion of a length of the wind turbine rotor blade;
        positioning the at least one core material section on the first carbon material layer with respect to a buckling prone region of the wind turbine rotor blade; and
        forming a second carbon material layer to cover the at least one core material section, the second carbon material layer extending along at least a portion of the length of the wind turbine rotor blade.

17. A method in accordance with claim 16 further comprising coupling a second sparcap to an inner surface of the second blade section, the second sparcap comprising at least one carbon material layer and at least one core material section.

18. A method in accordance with claim 17 further comprising coupling the first sparcap to the second sparcap.

* * * * *